(12) United States Patent
Block et al.

(10) Patent No.: US 6,442,713 B1
(45) Date of Patent: Aug. 27, 2002

(54) CLUSTER NODE DISTRESS SIGNAL

(75) Inventors: Timothy Roy Block, Rochester; Rodney Lee Rabe, Byron, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,026

(22) Filed: Mar. 30, 1999

(51) Int. Cl.[7] ................................................. G06F 11/00
(52) U.S. Cl. ......................................... 714/43; 709/220
(58) Field of Search .............................. 714/43, 44, 45, 714/47, 48, 6, 7, 13, 39, 41, 46, 25, 30; 709/203, 220, 221

(56) References Cited

U.S. PATENT DOCUMENTS

| | | | | |
|---|---|---|---|---|
| 4,486,826 A | * | 12/1984 | Wolff et al. .................... 371/67 |
| 4,654,857 A | * | 3/1987 | Samson et al. ................ 371/68 |
| 5,117,352 A | | 5/1992 | Falek .......................... 395/575 |
| 5,371,852 A | * | 12/1994 | Attanasio et al. ............ 395/200 |
| 5,440,726 A | * | 8/1995 | Fuchs et al. .............. 395/82.18 |
| 5,590,277 A | * | 12/1996 | Fuchs et al. ............. 395/183.14 |
| 5,627,962 A | * | 5/1997 | Goodrum et al. ...... 395/182.11 |
| 5,805,785 A | * | 9/1998 | Dias et al. .............. 395/182.02 |
| 6,122,735 A | * | 9/2000 | Steiert et al. .................... 713/2 |
| 6,151,688 A | * | 11/2000 | Wipfel et al. .................. 714/48 |
| 6,192,483 B1 | * | 2/2001 | Moiin et al. .................... 714/4 |
| 6,243,814 B1 | * | 6/2001 | Matena |

* cited by examiner

*Primary Examiner*—Nadeem Iqbal
(74) *Attorney, Agent, or Firm*—Schmeiser, Olsen & Watts; Steven W. Roth

(57) ABSTRACT

The preferred embodiment of the present invention provides a cluster node distress system and method that improves the reliability of a cluster. The cluster node distress system provides a cluster node distress signal when a node on the cluster is about to fail. This allows the cluster to better to determine whether a non-communicating node has failed or has merely been partitioned from the cluster. The preferred cluster node distress system is embedded deeply into the operating system and provides a pre-built node distress signal that can be quickly sent to other nodes in the cluster when an imminent failure of that node is detected, improving the probability that the node distress signal will get out before the node totally fails. When the node distress signal is effectively sent to other nodes in the cluster, the cluster can accurately determine that the node has failed and has not just partitioned from the cluster. This allows the cluster to respond correctly, i.e., by assigning other nodes primary responsibility, with less intervention needed by administrators.

38 Claims, 3 Drawing Sheets

CLUSTER NODE DISTRESS SIGNAL

BACKGROUND OF THE INVENTION

1. Technical Field

This invention generally relates to clustering computers, and more specifically relates to distress signaling for cluster communications.

2. Background Art

Society depends upon computer systems for many types of information in this electronic age. Based upon various combinations of hardware (e.g., semiconductors, circuit boards, etc.) and software (e.g., computer programs), computer systems vary widely in design. Many computer systems today are designed to "network" with other computer systems. Through networking, a single computer system can access information stored on and processed by other computer systems. Thus, networking results in greater numbers of computer systems having access to greater numbers of electronic resources.

Networking is made possible by physical "routes" between computer systems, and the use of agreed upon communications "protocols." What protocol is chosen depends upon factors including the number of networked computer systems, the distances separating the computer systems, and the purposes of information exchange between the computer systems. Communications protocols can be very simplistic if only a few computer systems are networked together at close proximity. However, these communications protocols become more sophisticated as greater numbers of computer systems are added, and as computer systems are separated by greater distances.

The sophistication of communications protocols also varies with the type of information exchange. For instance, some protocols emphasize accuracy in sending large amounts of information, while others emphasize the speed of information transfer. The communications requirements of the applications running on a computer system network determine what type of protocol is chosen. An example of a computer application requiring real-time, reliable information transfer is a "cluster" management application.

Clustering is the networking of computer systems for the purpose of providing continuous resource availability and for sharing workload. A cluster of computer systems appears as one computer system from a computer system user's perspective, but actually is a network of computer systems backing each other up. In the event of an overload or failure on one computer system in a cluster, cluster management applications automatically reassign processing responsibilities for the failing computer system to another computer system in the cluster. Thus, from a user's perspective there is no interruption in the availability of resources.

Typically, one node in the cluster is assigned primary responsibility for an application (e.g., database, server) and other nodes are assigned backup responsibility. When the primary node for an application fails, the back up nodes in the cluster take over responsibility for that application. This ensures the high availability of that application.

Clustering is made possible through cluster management application programs running on each computer system in a cluster. These applications relay cluster messages back and forth across the cluster network to control cluster activities. Cluster messaging is also used to distribute updates about which computer systems in the cluster have what primary and back-up responsibilities.

To ensure the high availability of applications running on the cluster, the cluster needs to be able to keep track of the status of all the nodes on a cluster. To do this, each computer system in a cluster continuously monitors each of the other computer systems in the same cluster to ensure that each is alive and performing the processing assigned to it. Thus, when a node on a cluster fails, its primary responsibilities can be assigned to the backup nodes.

Unfortunately, it is not always possible to tell that a node in the cluster has failed. For example, if the network connection between one node and the rest of the cluster fail, the cluster will no longer be able to tell if that node is operating properly. If a node is still operating but its network connection to other nodes in the cluster has failed, then the node is said to have been "partitioned" from the cluster. When a node unexpectedly stops communicating with the rest of the cluster it cannot be easily determined whether the node has failed or instead has been merely partitioned from the rest of the cluster. If the cluster incorrectly assumes the node has failed, and assigns the backup node primary responsibility for the application, the cluster can will have two nodes both believing that they are the primary node. This can result in data inconsistencies in the database as both nodes respond to requests to the cluster. If on the other hand, the cluster incorrectly assumes the node is still performing its primary applications and has only been partitioned from the cluster, and does not assign primary responsibility to the back up node, then those applications will no longer be available to the clients of the cluster. Thus, in many cases the cluster is unable to correctly respond to a non-communicating node without manual intervention by administrators.

As more resources become accessible across computer system networks, the demand for continuous access to such network resources will grow. The demand for clusters as a means to provide continuous availability to such network resources will grow correspondingly. Without improved methods for determining the status of cluster nodes, the continuous availability these resources will not be fully realized.

DISCLOSURE OF INVENTION

According to the present invention, a cluster node distress system is provided that improves the reliability of a cluster. The cluster node distress system provides a cluster node distress signal when a node on the cluster is about to fail. This allows the cluster to better determine whether a non-communicating node has failed or has merely been partitioned from the cluster. The preferred cluster node distress system is embedded deeply into the operating system and provides a pre-built node distress signal that can be quickly sent to other nodes in the cluster when an imminent failure of that node is detected. This improves the probability that the node distress signal will get out before the node totally fails. When the node distress signal is effectively sent to the cluster, the cluster can accurately determine that the node has failed and has not just partitioned from the cluster. This allows the cluster to respond correctly, i.e., by assigning other nodes primary responsibility, and requires less intervention by administrators. Thus, the preferred embodiment provides improved cluster reliability and decreased reliance on administrators.

The foregoing and other features and advantages of the invention will be apparent from the following more particular description as set forth in the preferred embodiments of the invention, and as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
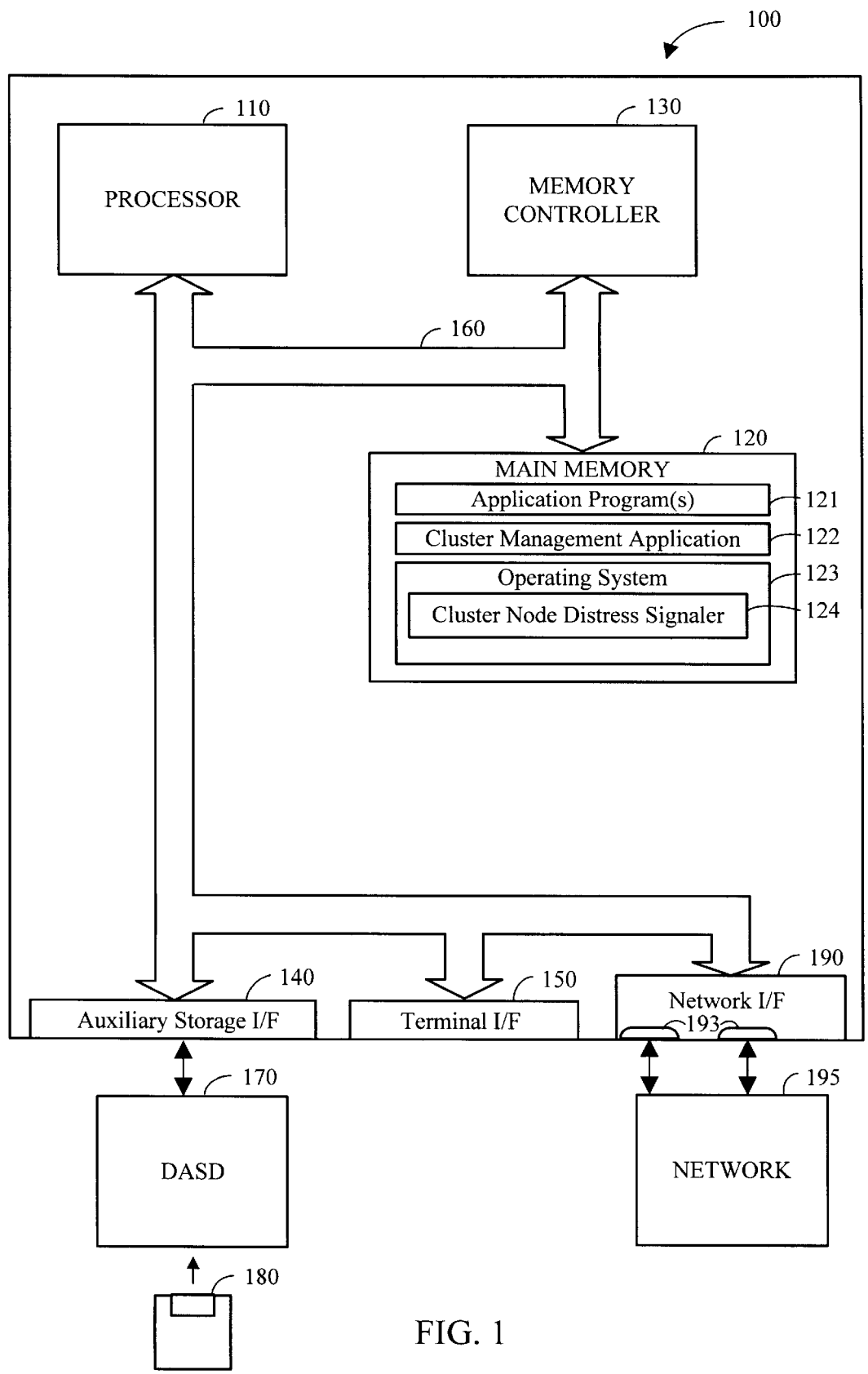
FIG. 1 is a block diagram of an apparatus according to a preferred embodiment of the present invention.

The present invention relates to cluster communications. For those individuals who are not generally familiar with the concepts of clustering, the Overview section below presents many of the basic concepts and terminology that will help to understand the preferred embodiment of the present invention. Individuals skilled in the art of clustering may skip the Overview and proceed directly to the Detailed Description of this specification.

1. Overview

Clustering is the linking together of computers, or groups of computers, in a way that allows the computers to share work and act as back ups for each other. As such, a cluster allows a computer system to continue to operate and provide services even if one or more of the computers in the cluster fails. From the computer user's perspective, the cluster of computer systems appears as one computer system. Clustering is transparent to the users of computer clusters, who need not be aware of whether they are using one computer system or multiple computer systems. Instead, what matters to the users of computer clusters is that they have access to the resources they need, such as databases, printers, files, etc. By clustering computer systems together, continuous availability to necessary resources can be achieved.

There are numerous advantages to clustering computer systems together. First, and most important, clusters provide higher availability by allowing computer systems within a cluster to back each other up. Second, clustering increases scalability, by allowing additional computer systems to be added as needed to improve processing power. Third, workloads can be balanced between computer systems in a cluster.

The computer systems that make up a cluster are also called "nodes." Technically, the term node can refer to processors, communications controllers, or terminals. However for the purposes of a cluster, a node refers to one of the individual computer systems in a cluster. Typically, each node in a cluster is assigned primary and backup responsibilities in support of the cluster. Assigned responsibilities may be for one or for multiple functions such as providing access to data, performing computer applications, or providing access to hardware resources, as in printers, scanners, or fax machines. The nodes in the cluster communicate to ensure that all nodes are functioning, that is, that clustering software on each node is alive and actively monitoring for conditions that would require a switch from primary to backup.

Nodes in a cluster are assigned primary and backup responsibilities. The primary node for each application is the node that performs the task and interacts with clients of the cluster. When the primary node becomes unable to perform its assigned functions, the cluster management applications must act to ensure that the cluster user still has access to the resources assigned to the node that is unable to perform. This involves switching one of the backup nodes for that resource to primary responsibility. In this manner, the cluster user still has access to needed resources, even when the computer system primarily responsible for providing those resources is unavailable.

Custer management applications and a communications infrastructure between all the nodes enable a cluster to operate as a single computer system from a user's perspective. For instance, messages are sent to every node to inform them about the situation with respect to the other nodes in the cluster. Messages are sent to every node to keep them up-to-date as to what nodes have primary and backup responsibilities for particular applications. This prevents multiple nodes from attempting to perform conflicting operations, such as the multiple nodes trying to behave as the primary node for a particular application. If two nodes are allowed to operate thinking they are both primary nodes, problems such as data inconsistencies can occur. Thus, messages are sent to every node so that all will be in agreement as to what action to take when one node is unable to perform its assigned responsibilities. Every node in the cluster must receive these cluster messages in the correct order to ensure proper cluster functioning.

One type of basic cluster messages are called "heartbeats". Heartbeats are low level messages sent between nodes in the cluster to allow the cluster to keep track of which nodes are presently performing properly. For example, the each node will typically send a logically adjacent node a heartbeat signal at regular intervals. Each node in the cluster thus expects to receive a heartbeat signal from its logically adjacent node at these same regular intervals. If a node does not receive the proper heartbeat signal for a extended period of time, that node knows there is a potential problem with its neighbor node. If this failure to receive a heartbeat continues, the cluster management system will attempt to take appropriate action.

Another way the cluster monitors its node is through message timers. In a exemplary clustering system, if a message sent to a node fails, it will automatically be retried for a set period of time. Additionally, the message could be attempted using other addresses available for that node. If after multiple tries the message is still undelivered, the cluster management system will again know there is a problem and attempt to take appropriate action.

Unfortunately, it is not always possible for the cluster management system to know what is the appropriate action to take. For example, if the network connection between node and the rest of the cluster fail, the cluster will no longer be able to tell if that node is operating properly. If a node is still operating but its network connection to other nodes in the cluster has failed, then the node is said to have been "partitioned" from the cluster. When a node unexpectedly stops communicating with the rest of the cluster it cannot be easily determined whether the node has failed or instead has been merely partitioned from the rest of the cluster. If the cluster incorrectly assumes the node has failed when it has only partitioned, and assigns a backup node primary responsibility for the partitioned node's applications, the cluster can be left with two nodes both believing that they are the primary node. Again, this can result in data inconsistencies as both nodes respond to requests to the cluster. If on the other hand, the cluster incorrectly assumes the node has partitioned when it has actually failed, and does not assign primary responsibility for the failed node's applications to a backup node, then those applications will no longer be available to the clients of the cluster. Thus, in many cases the cluster is unable to correctly respond to a non-communicating node without manual intervention by administrators.

2. Detailed Description

According to the present invention, a cluster node distress system is provided that improves the reliability of a cluster. The cluster node distress system provides a cluster node distress signal when a node on the cluster is about the fail. This allows the cluster to better determine whether a non-communicating node has failed or has merely been partitioned from the cluster. The preferred cluster node distress system is embedded deeply into the operating system and provides a pre-built node distress signal that can be quickly sent to other nodes in the cluster when an imminent failure of that node is detected. This improves the probability that the node distress signal will get out before the node totally fails. When the node distress signal is effectively sent to the cluster, the cluster can accurately determine that the node has failed and has not just been partitioned from the cluster. This allows the cluster to respond correctly, i.e., by assigning other nodes primary responsibility, with less intervention needed by administrators. Thus, the preferred embodiment provides improved cluster reliability and decreased reliance on administrators.

Referring now to FIG. 1, a computer system 100 in accordance with a preferred embodiment of the present invention is an AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. For example, those skilled in the art will recognize that these functions can also be provided to other systems, such as IBM's OS/2, OS/390 and RS/6000, Microsoft's Windows NT, Novell's NetWare, Linux and the other various flavors of Unix. Computer system 100 illustrates in detail the preferred embodiment of how one node in a cluster would be configured, where other nodes in the cluster reside on network 195. Computer system 100 suitably comprises a processor 110, a main memory 120, a memory controller 130, an auxiliary storage interface 140, a terminal interface 150, and a network interface 190, all of which are interconnected via a system bus 160. Note that various modifications, additions, or deletions may be made to computer system 100 illustrated in FIG. 1 within the scope of the present invention, such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes computer programs within main memory 120 as needed.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Network interface 190 supports the transfer of information between computer system 100 and remote computer systems in network 195. In the preferred embodiment, one or more nodes on the network 195 are similarly set up to work with computer system 100 as a cluster. Network interface 190 suitably includes one or more network interface adapters 193, each network interface adapter 193 typically implemented as an expansion card that can easily be added to computer systems such as computer system 100. Examples of network interface adapter 193 include Peripheral Component Interconnect (PCI) expansion cards, Industry Standard Architecture (ISA) expansion cards, proprietary adapter cards, and any types of adapters known now or invented in the future. Those skilled in the art will recognize that the functionality of network interface 190 can be implemented directly as part of main memory and processor 110. Network 195 represents any type of network known to those skilled in the art. This includes Internet, Intranets, Local Area Networks (LAN's), Wide Area Networks (WAN's) or any configuration of hardware and software, currently known or developed in the future, by which computer systems communicate with each other. On network 195 will exist other nodes which are also on the cluster.

Main memory 120 suitably contains one or more application programs 121, cluster management applications 122, and operating system 123, which includes a cluster node distress signaler 124. All of these programs in memory in memory 120 are used in its broadest sense, and includes any and all forms of computer programs, including source code, intermediate code, machine code, and any other representation of a computer program.

In the preferred embodiment, application programs 121 can comprise any program for which clustering will be used to provide increased reliability and scalability. As such, application programs 121 would typically include all the programs for which computer system 100 is either a primary or a backup node. Examples of such application programs include Web Servers, File Servers, Data Base Servers, etc.

Cluster management application 122 provides the mechanism needed to create and manage the cluster. This would include the processing of administrative requests for the management of a computer cluster. For example, this would preferably include the mechanisms for creating a cluster, adding and removing nodes to a cluster, etc.

In the preferred embodiment, cluster distress signaler 124 is integrated with the operating system 123 to provide the quickest and most efficient means of sending node distress signals when the imminent failure of a node is detected.

It should be understood that main memory 120 will not necessarily contain all parts of all mechanisms shown at all times. For example, portions of application program 121, cluster management application 122, and operating system 123 may be loaded into an instruction cache (not shown) for processor 110 to execute, while other files may well be stored on magnetic or optical disk storage devices (not shown). In addition, although the computer programs are all shown to reside in the same memory location, it is to be understood that main memory 120 may consist of disparate memory locations. The term "memory" as used herein refers to any storage location in the virtual memory space of system 100.

It should also be understood that computer system 100 is exemplary of each node in a cluster, and that thus each node in the cluster would have the ability to quickly send node distress signals to other nodes in the cluster in the event of its failure. The cluster management applications 122 on each of the other nodes can then respond appropriately, i.e., by assigning appropriate primary responsibility to other nodes in the cluster.

Figure 2:
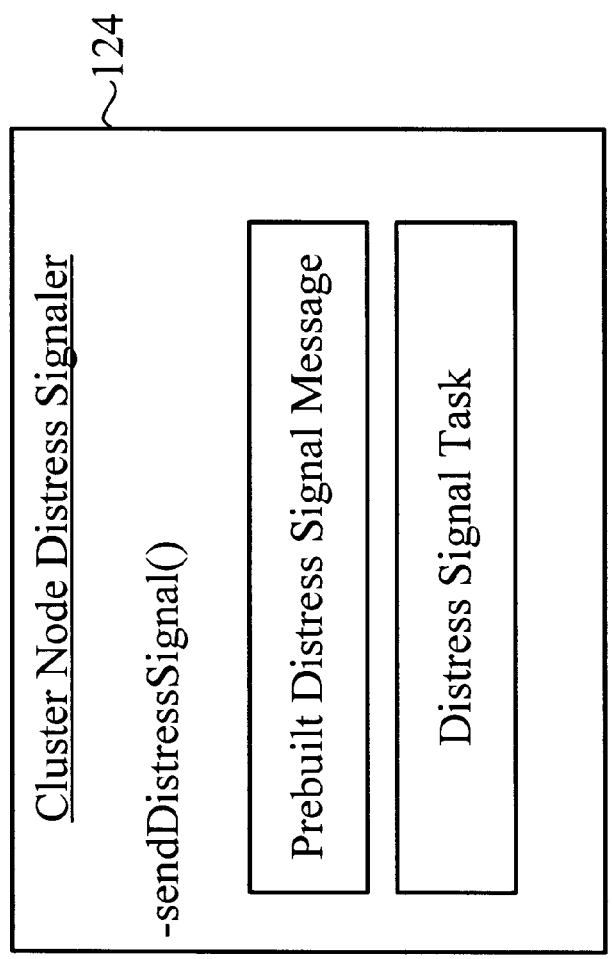
FIG. 2 is a schematic diagram illustrating a cluster node distress signaler in accordance with the preferred embodiment of the present invention.

Turning now to FIG. 2, the preferred embodiment cluster node distress signaler 124 is illustrated in more detail. As described above, the cluster node distress signaler 124 provides the mechanisms needed to send a distress signal to other nodes in a cluster upon the imminent failure of the node. This allows the cluster management application 122 (on the other nodes of the cluster) to accurately determine that a non-responding node has failed, and has not just been partitioned from the cluster.

In the preferred embodiment, the cluster node distress signaler 124 is integrated into the operating system 123 to allow it to respond quickly to imminent failure of the node. In the preferred embodiment, the cluster node distress signaler 124 includes a send distress signal method, a prebuilt distress message, and a dedicated distress signal task for sending the message.

In the most preferred embodiment, there are two implementations of the send distress signal method available. One sends the distress signal message synchronously, meaning that all other methods to be performed during the shutdown are put on hold until that message is confirmed as sent. The other method sends the distress signal asynchronously, meaning that the cluster node can continue processing other tasks after starting the send distress signal method.

In the preferred embodiment, the asynchronous method is used when there is sufficient time for an orderly shutdown of the node. Using the asynchronous method allows the current execution thread to perform other tasks in preparation for shutdown while the distress message is being sent. Allowing the node's current execution thread to continue to perform other tasks while preparing and sending the distress message has the advantage of resulting in a more orderly shutdown, but the disadvantage of a potentially longer delay before the distress message is actually sent. Conversely, the synchronous method is preferable when failure is imminent and the distress message must be sent immediately. The synchronous method puts all other processing on the current execution thread on hold until the distress message is sent, resulting in quicker sending of the node distress message.

For example, if the failure event is a power outage but there remains battery backup power, there will be relatively more time before failure to allow the distress message to be sent asynchronously. This allows for more parallel actions to be performed, such as other shutdown procedures, providing for a more orderly shutdown.

As another example, if the failure event is a hardware failure or a termination of the IP stack then there may not be time to wait, and it is preferable to send the distress message synchronously. This results in immediate sending of the prebuilt distress message, with the current execution thread not moving on to other processes until that message is sent. This allows the distress message to be sent as quickly as possible, and in some cases prevents the node from shutting down before the distress message can be sent.

In the preferred embodiment, synchronous distress signal messages are processed in the current execution task, allowing the message to be sent more quickly. In particular, the current task can immediately send the message, while the waiting dedicated distress task may have to be awakened before the message can be sent. But, because the current task is used to send the distress message without allowing it to move on until the message is sent, other actions that may need to be performed will be on hold. Thus, using a synchronous method to send the distress signal message improves the chances of the message being sent before the failure event occurs, but at the expense of other processes.

Conversely, asynchronous distress signal messages are sent to a task queue for the dedicated distress signal task, and run in its context. Typically, this task will need to be awakened to perform the sending of the message, but because there will be nothing else on its queue it will still be faster than using a non-dedicated task. Once the asynchronous call is made to the dedicated distress task, the current task can continue on with its other processes, without waiting for the distress message to be sent.

The dedicated distress signal task for sending the message preferably comprises a low level execution thread in the operating system that functions as a process. This can be implemented as an instantiated task object waiting to be executed when called. When the asynchronous distress signal method is called, it calls the task object message queue. The next processor available will then pick up the code defined by this method and run it. Because there is a dedicated task for sending the node distress signal, there is no possibility of the method having to wait in the task object message queue. Instead, it will be run by the next available processor. Typical operating systems have many different tasks available to run at any given time, but only one task can be executed by each processor at a time. When the processor has to wait for something, then the current task is set aside and it goes onto the next.

The prebuilt distress message preferably includes a previously instantiated message object that is ready to be sent in the event of a failure event. The message preferably includes a header that indicates it is a node distress message, and the ID of the node that sent the distress message. The message could also include data as to the reason for its failure, if known, although this is not required.

Figure 3:
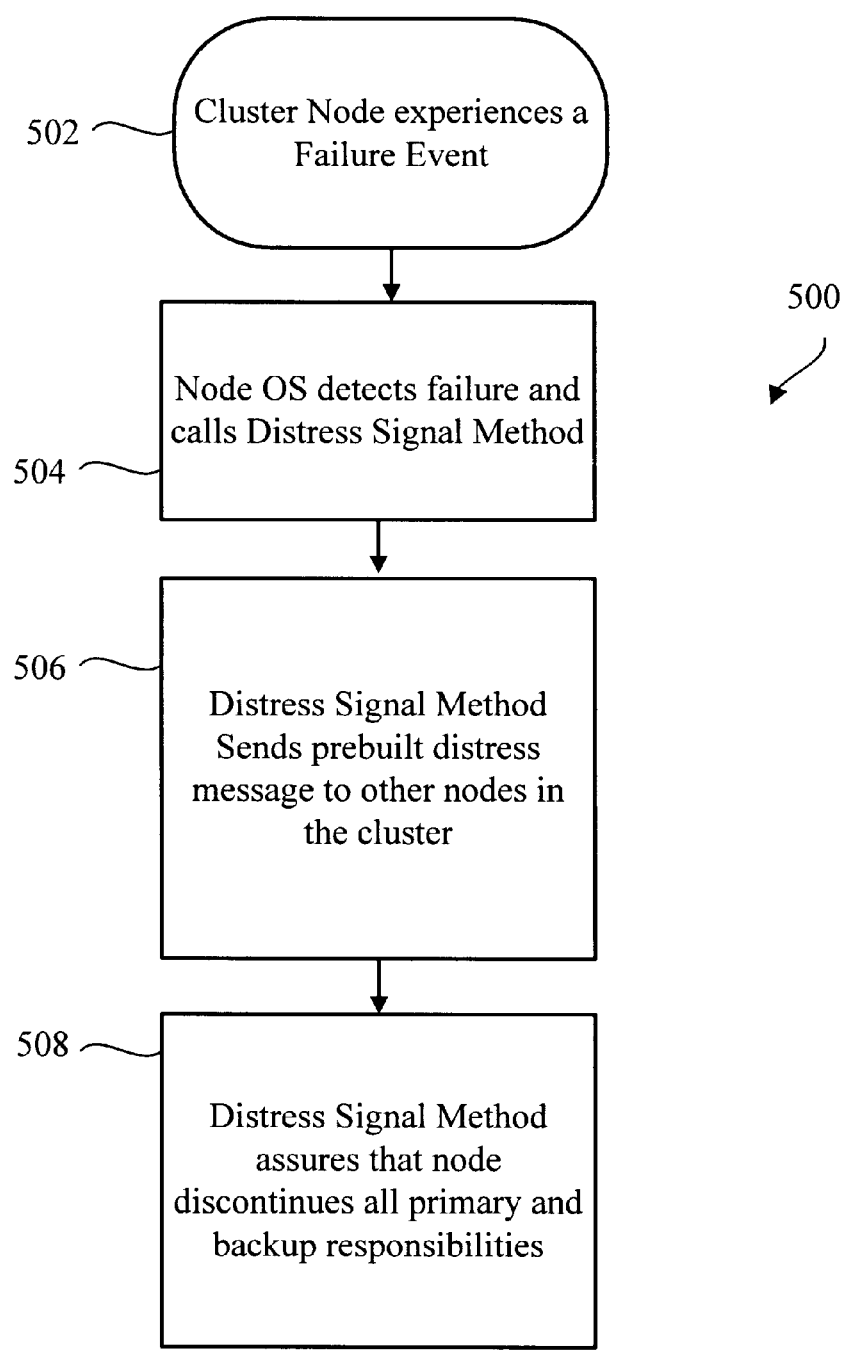
FIG. 3 is a flow diagram of a cluster distress signal method in accordance with the preferred embodiment of the present invention.

Turning now to FIG. 3, a method 500 for sending a node distress signal in accordance with the preferred embodiment is illustrated. The first step 502 is when the cluster node experiences a failure event. The next step 504 is for the node's system to detect the failure and call the distress signal method on the cluster node distress signaler.

In the preferred embodiment, any type of failure event can be detected, although in reality not all types of failure events can be adequately detected in time for the correct response. For example, one type of failure event is the loss of power. Preferably, the node computer system can detect the loss of power while maintaining operation long enough for the cluster node distress signal to be sent. As described above, because the cluster node distress signaler includes a prebuilt distress signal, the node distress signal can be sent much quicker than the previous mechanism would allow. This increases the likelihood that the failure event was detected in time for the message to be sent before the node completely fails. As another example of a failure event, a take down of the protocol stack used to communicate with other members of the node can be detected by the node system long enough before it goes down to call and send the distress message.

Of course, these are just three types of failure events that could be detected by the node system with sufficient advanced warning to send the cluster node distress signal. Other failure events could be impending crashes in operating system, failure of one or more hardware components (e.g., drives, network adapters, etc.) Those skilled in the art will thus recognize that the preferred embodiments of the present invention can be applied to any type of failure event that can be detected far enough in advance to send the distress signal, and that the ability of the preferred embodiment to quickly send the pre-built distress signal greatly reduces the advance warning needed over prior systems.

Preferably, the operating system recognizes the type of failure event that is occurring, such that it can call the appropriate send distress signal method (i.e., asynchronous or synchronous) depending upon the amount of time before failure occurs. Additionally, if the operating system does not recognize the type of failure as being one that can be responded to asynchronously, it preferably calls the synchronous method to best assure that the distress message will be sent before failure occurs.

The next step 506 is for the distress signal method to send a prebuilt distress signal using a dedicated distress signal task to any listeners in the cluster. The pre-built distress signal preferably comprises an instantiated message object that includes the name of the node sending the message. This allows the distress signal to be quickly put onto the protocol stack without having to wait for the message to be built first.

In the preferred embodiment, step 506 can be performed either asynchronously or synchronously, depending on the type of failure event detected and the amount of time remaining to send the prebuilt distress signal.

The next step 506 is for the distress signal method to assure that the node discontinues all primary and backup responsibilities. Again, it is undesirable for multiple nodes to all attempt to perform primary functions for some applications. Thus, by sending the node distress signal this node informs the other nodes that it is no longer available, and must be replaced by the appropriate back up node. If for some reason this node recovers, it must still take itself offline because another node will have likely begun to perform its previous primary responsibilities.

Thus, the preferred embodiment of the present invention provides a cluster node distress system and method that improves the reliability of a cluster. The cluster node distress system provides a cluster node distress signal when a node on the cluster is about to fail. This allows the cluster to better to determine whether the non-communicating node has failed or has merely been partitioned from the cluster. The preferred cluster node distress system is embedded deeply into the operating system and provides a pre-built node distress signal that can be quickly sent to other nodes in the cluster when an imminent failure of that node is detected, improving the probability that the node distress signal will get out before the node totally fails. When the node distress signal is effectively sent to the cluster, the cluster can accurately determine that the node has failed and has not just partitioned from the cluster. This allows the cluster to respond correctly, i.e., by assigning other nodes primary responsibility, and requires less intervention by administrators.

While the invention has been particularly shown and described with reference to preferred embodiments thereof, it will be understood by those skilled in the art that various changes in form and details may be made therein without departing from the spirit and scope of the invention.

What is claimed is:

1. A node in a cluster of nodes, the node comprising:
   at least one processor;
   a memory coupled to at least one processor;
   a cluster node distress signaler residing in said memory, the cluster node distress signaler including a prebuilt distress message indicating failure of the node on a cluster, the cluster node distress signaler sending the prebuilt distress message to the other nodes in the cluster when a failure event is detected.

2. The apparatus of claim 1 wherein the cluster node distress signaler includes a dedicated distress signal execution task waiting to send the prebuilt distress message when a failure event is detected.

3. The apparatus of claim 1 wherein the cluster distress signaler includes a method for sending the prebuilt distress message asynchronously and a method for sending the prebuilt distress message synchronously.

4. The apparatus of claim 3 wherein the method for sending the prebuilt distress message asynchronously uses a current execution task to send to the prebuilt distress message and wherein the method for sending the prebuilt distress message synchronously uses a waiting dedicated distress signal execution task.

5. The apparatus of claim 4 wherein said cluster distress node signaler uses the method for sending the prebuilt distress message asynchronously to allow for more orderly shutdown procedures when sufficient time before the failure event exists, and uses the method for sending the prebuilt distress message synchronously otherwise.

6. The apparatus of claim 1 wherein the cluster distress node signaler includes a mechanism for assuring the node removes itself from the cluster after the cluster distress signal has been sent to the other nodes in the cluster.

7. The apparatus of claim 1 wherein the cluster distress node signaler comprises an integrated part of an operating system residing in the memory.

8. The apparatus of claim 1 wherein the prebuilt distress message comprises a previously instantiated message object.

9. A cluster node apparatus comprising:
   at least one processor;
   a memory coupled to at least one processor;
   a cluster node distress signaler residing in said memory, the cluster node distress signaler including a prebuilt distress message indicating failure of the cluster node apparatus, wherein the cluster node distress signaler includes a method for sending the prebuilt distress message asynchronously that uses a current execution task and a method for sending the prebuilt distress message synchronously method uses a waiting dedicated distress signal execution task, and wherein the cluster node distress signaler sends the prebuilt distress message to the other nodes in the cluster when a failure event is detected.

10. The apparatus of claim 9 wherein said cluster distress node signaler uses the method for sending the prebuilt distress message asynchronously to allow for more orderly shutdown procedures when sufficient time before the failure event exists, and uses the method for sending the prebuilt distress message synchronously otherwise.

11. The apparatus of claim 9 wherein the cluster distress node signaler includes a mechanism for assuring the cluster node apparatus removes itself from the cluster after the cluster distress signal has been sent to the other nodes in the cluster.

12. The apparatus of claim 9 wherein the cluster distress node signaler is part of an operating system residing in memory.

13. The apparatus of claim 9 wherein the prebuilt distress message comprises a previously instantiated message object.

14. A method comprising the steps of:
providing a prebuilt distress message indicating a node on a cluster is experiencing a failure event; and
sending the prebuilt distress message when an impending failure event is detected within the node.

15. The method of claim 14 further comprising the step of providing a dedicated distress signal task to process and send the prebuilt distress message.

16. The method of claim 14 wherein the step of sending the prebuilt distress message comprises sending the prebuilt distress message asynchronously to allow for more orderly shutdown procedures when sufficient time before the impending failure event exists and sending the prebuilt distress message synchronously otherwise.

17. The method of claim 14 further comprising the step of assuring the node removes itself from the cluster after the cluster distress signal has been sent to the other nodes in the cluster.

18. The method of claim 14 further comprising the step of determining the type of impending failure event.

19. A method comprising the steps of:
providing a prebuilt distress message indicating a node on a cluster is experiencing a failure event;
providing a dedicated distress signal task to process and send the prebuilt distress message;
detecting an impending failure event within the node;
asynchronously sending the prebuilt distress message to other nodes in the cluster when sufficient time before the detected impending failure event exists and otherwise sending the prebuilt distress message to the other nodes in the synchronously; and
assuring the node removes itself from the cluster after the cluster distress signal has been sent to the other nodes in the cluster.

20. The method of claim 19 wherein the step of asynchronously sending the prebuilt distress message uses the dedicated distress signal task and wherein the step of synchronously sending the prebuilt distress message uses a current execution task.

21. The method of claim 19 wherein the prebuilt distress message comprises a previously instantiated message object.

22. A program product comprising:
(A) a cluster node distress signaler including a prebuilt distress message indicating failure of a node on a cluster, the cluster node distress signaler sending the prebuilt distress message from the node to the other nodes in the cluster when a failure event is detected; and
(B) signal bearing media bearing said cluster node distress signaler.

23. The program product of claim 22 wherein said signal bearing media comprises transmission media.

24. The program product of claim 22 wherein said signal bearing media comprises recordable media.

25. The program product of claim 22 wherein the cluster node distress signaler includes a dedicated distress signal execution task waiting to send the prebuilt distress message when a failure event is detected.

26. The program product of claim 22 wherein the cluster distress signaler includes a method for sending the prebuilt distress message asynchronously and a method for sending the prebuilt distress message synchronously.

27. The program product of claim 26 wherein the method for sending the prebuilt distress message asynchronously uses a current execution task to send to the prebuilt distress message and wherein the method for sending the prebuilt distress message synchronously uses a waiting dedicated distress signal execution task.

28. The program product of claim 27 wherein said cluster distress node signaler uses the method for sending the prebuilt distress message asynchronously to allow for more orderly shutdown procedures when sufficient time before the failure event exists, and uses the method for sending the prebuilt distress message synchronously otherwise.

29. The program product of claim 22 wherein the cluster distress node signaler includes a mechanism for assuring the node removes itself from the cluster after the cluster distress signal has been sent to the other nodes in the cluster.

30. The program product of claim 22 wherein the cluster distress node signaler comprises an integrated part of an operating system residing in the memory.

31. The program product of claim 22 wherein the prebuilt distress message comprises a previously instantiated message object.

32. A program product comprising:
(A) a cluster node distress signaler including a prebuilt distress message indicating failure of a cluster node apparatus, wherein the cluster node distress signaler includes a method for sending the prebuilt distress message asynchronously that uses a current execution task and a method for sending the prebuilt distress message synchronously method uses a waiting dedicated distress signal execution task, and wherein the cluster node distress signaler sends the prebuilt distress message from the cluster node apparatus to the other nodes in the cluster when a failure event is detected; and
(B) signal bearing media bearing the cluster node distress signaler.

33. The program product of claim 32 wherein said signal bearing media comprises transmission media.

34. The program product of claim 32 wherein said signal bearing media comprises recordable media.

35. The program product of claim 32 wherein said cluster distress node signaler uses the method for sending the prebuilt distress message asynchronously to allow for more orderly shutdown procedures when sufficient time before the failure event exists, and uses the method for sending the prebuilt distress message synchronously otherwise.

36. The program product of claim 32 wherein the cluster distress node signaler includes a mechanism for assuring the cluster node apparatus removes itself from the cluster after the cluster distress signal has been sent to the other nodes in the cluster.

37. The program product of claim 32 wherein the cluster distress node signaler is part of an operating system residing on the signal bearing media.

38. The program product of claim 32 wherein the prebuilt distress message comprises a previously instantiated message object.

* * * * *